(12) United States Patent
Bager

(10) Patent No.: US 12,006,976 B2
(45) Date of Patent: Jun. 11, 2024

(54) BEARING MONITORING BY PRESSURE SENSOR

(71) Applicant: Vestas Wind Systems A/S, Aarhus N (DK)

(72) Inventor: Christian Bager, Herne (DE)

(73) Assignee: Vestas Wind Systems A/S, Aarhus N. (DK)

( * ) Notice: Subject to any disclaimer, the term of this patent is extended or adjusted under 35 U.S.C. 154(b) by 133 days.

(21) Appl. No.: 17/908,028

(22) PCT Filed: Apr. 19, 2021

(86) PCT No.: PCT/DK2021/050114
§ 371 (c)(1),
(2) Date: Aug. 30, 2022

(87) PCT Pub. No.: WO2021/213597
PCT Pub. Date: Oct. 28, 2021

(65) Prior Publication Data
US 2023/0099070 A1 Mar. 30, 2023

(30) Foreign Application Priority Data

Apr. 21, 2020 (DK) .................................. 2020 70243

(51) Int. Cl.
*F16C 19/52* (2006.01)
*F03D 80/70* (2016.01)
*F16C 33/66* (2006.01)

(52) U.S. Cl.
CPC .......... *F16C 33/6625* (2013.01); *F03D 80/70* (2016.05); *F16C 19/52* (2013.01); *F16C 2233/00* (2013.01); *F16C 2360/31* (2013.01)

(58) Field of Classification Search
CPC .. F16C 19/52; F16C 33/6622; F16C 33/6625; F16C 2233/00; F16C 2360/31;
(Continued)

(56) References Cited

U.S. PATENT DOCUMENTS

2014/0133985 A1\* 5/2014 Mongeau ................ F16C 17/02
416/174
2015/0285224 A1 10/2015 Hambrecht
(Continued)

FOREIGN PATENT DOCUMENTS

CN 102235422 A \* 11/2011 ............. F03D 80/70
CN 108953077 A 12/2018
(Continued)

OTHER PUBLICATIONS

European Patent Office, examination report issued in corresponding EP Application No. 21725022.4, dated Jul. 31, 2023.
(Continued)

*Primary Examiner* — Phillip A Johnson
(74) *Attorney, Agent, or Firm* — Wood Herron & Evans LLP

(57) ABSTRACT

A wind turbine has a bearing housing, a rolling element bearing within the bearing housing and a space within the bearing housing for containing grease for lubricating the rolling element bearing. A shaft is rotatably supported by the rolling element bearing. A pressure sensor in fluid communication with the space measures the pressure of grease in the space within the bearing housing.

15 Claims, 10 Drawing Sheets

(58) Field of Classification Search
CPC ...... F03D 17/032; F03D 80/70; F03D 80/703; F03D 80/709
See application file for complete search history.

(56) References Cited

U.S. PATENT DOCUMENTS

| | | |
|---|---|---|
| 2016/0281788 A1 | 9/2016 | Bongaerts et al. |
| 2018/0223819 A1 | 8/2018 | Higashiyama et al. |
| 2020/0096427 A1 | 3/2020 | Yasuda |

FOREIGN PATENT DOCUMENTS

| | | | | |
|---|---|---|---|---|
| CN | 109139393 A | | 1/2019 | |
| CN | 109185080 A | * | 1/2019 | ........... F03D 7/0204 |
| CN | 109185080 B | | 11/2019 | |
| CN | 113623151 A | * | 11/2021 | |
| CN | 113803226 A | * | 12/2021 | ............. F03D 80/70 |
| JP | 2011202626 A | | 10/2011 | |
| JP | 2012154472 A | * | 8/2012 | |
| JP | 2020051445 A | | 4/2020 | |

OTHER PUBLICATIONS

Danish Patent and Trademark Office, Search and Examination Report in PA 2020 70243, Oct. 22, 2020.
European Patent Office, International Search Report and Written Opinion in PCT Application No. PCT/DK2021/050114, Aug. 13, 2021.

* cited by examiner

BEARING MONITORING BY PRESSURE SENSOR

FIELD OF THE INVENTION

The present invention is in the field of monitoring a rolling element bearing of a wind turbine.

BACKGROUND OF THE INVENTION

The main shaft of a wind turbine is rotatably supported by a rolling element bearing within a main bearing housing situated in the nacelle of the wind turbine. A gearbox may support the main shaft at the rear end of the main shaft. The rolling element bearing is usually monitored by temperature and/or vibration sensors. Both of these sensors can only detect a potential failure with the rolling element bearing after the rolling element bearing has already been damaged.

It is therefore desirable to be able to monitor the rolling element bearing and/or grease level within the main bearing housing so that action may be taken to prevent rolling element bearing damage.

SUMMARY OF THE INVENTION

A first aspect of the invention provides a wind turbine, the wind turbine comprising: a bearing housing comprising a rolling element bearing within the bearing housing and a space within the bearing housing for containing grease for lubricating the rolling element bearing; a shaft rotatably supported by the rolling element bearing; and, a pressure sensor, wherein the pressure sensor is in fluid communication with the space and configured to measure the pressure of grease in the space within the bearing housing.

An advantage of at least the first aspect is that the use of a pressure sensor can avoid a time consuming inspection of the rolling element bearing which may otherwise be done by periodically monitoring the rolling element bearing by removing the bearing housing cover and/or by disassembling part of the bearing arrangement. The pressure sensor may be used to generate important information for service planning to save on resources. The pressure sensor may be used to generate an early alert for grease losses, which may be caused by seal damage or wear. The pressure sensor may be used to monitor the fluid pressure within the bearing housing to ensure correct breather and seal function. The wind turbine may be used to back up the lubrication system function, e.g. to deliver grease from a grease reservoir into the space within the bearing housing to top up the grease level. The wind turbine may be used to cold trigger the lubrication system as emergency mediation, e.g. to deliver all of the grease from the grease reservoir into the space within the bearing housing until service can be organised.

The bearing housing may further comprise a grease outlet for adding and/or removing grease from the space within the bearing housing. The pressure sensor may be coupled to the grease outlet and may be suitable for containing grease inside the bearing housing during operation of the wind turbine.

The rolling element bearing may comprise a plurality of rolling elements spaced by a cage.

The pressure sensor may be a first pressure sensor. The wind turbine may further comprise a second pressure sensor in fluid communication with the space and may be configured to measure the pressure of the grease in the space within the bearing housing. The first pressure sensor may be in fluid communication with the space at a first measurement point, and the second pressure sensor may be in fluid communication with the space at a second measurement point.

The rolling element bearing may further comprise a second plurality of rolling elements spaced by a second cage. The first measurement point may be positioned to measure the pressure of grease in the space adjacent the first plurality of rolling elements, and the second measurement point may be further positioned to measure the pressure of grease in the space adjacent the second plurality of rolling elements.

The bearing housing may be a main bearing housing of the wind turbine. The shaft may be a main shaft of the wind turbine.

A second aspect of the invention provides a method of monitoring a wind turbine of the first aspect, the method comprising:
  rotating the shaft;
  measuring the pressure of grease in the space within the bearing housing using the pressure sensor to generate a pressure signal as the shaft rotates; and
  determining the cage slip ratio of the rolling element bearing, and/or, the amount of grease in the space within the bearing housing, based on the pressure signal.

Determining the cage slip ratio of the rolling element bearing may comprise: determining a cage frequency from the pressure signal, wherein the cage frequency may correspond to an angular rotation speed of the plurality of rolling elements of the rolling element bearing; measuring the shaft angular rotation speed; and calculating the cage slip ratio of the rolling element bearing may be based on the determined cage frequency, and an ideal cage frequency at the measured shaft angular rotation speed.

Determining the cage frequency from the pressure signal may comprise decomposing the pressure signal into its constituent frequencies and identifying the frequency corresponding to the angular rotation speed of the plurality of rolling elements of the rolling element bearing.

Determining the amount of grease in the space within the bearing housing may comprise: decomposing the pressure signal into its constituent frequencies and identifying the frequency corresponding to the angular rotation speed of the plurality of rolling elements of the rolling element bearing; measuring the amplitude of the decomposed pressure signal at the frequency corresponding to the angular rotation speed of the plurality of rolling elements of the rolling bearing element; and, estimating the amount of grease in the space within the bearing housing based on the measured amplitude.

Transmitting a maintenance request for wind turbine maintenance may be based on the determined cage slip ratio, and/or, amount of grease.

The method may comprise controlling the speed of the shaft or halting operation of the wind turbine based on the determined cage slip ratio, and/or, amount of grease.

The method may comprise performing maintenance on the wind turbine based on the determined cage slip ratio, and/or, amount of grease.

A third aspect of the invention provides a method of assembling or retro-fitting a wind turbine comprising a bearing housing, a rolling element bearing within the bearing housing and a space within the bearing housing for containing grease for lubricating the rolling element bearing, and a shaft rotatably supported by the rolling element bearing, the method comprising:

fitting a pressure sensor such that it is in fluid communication with the space and configured to measure the pressure of grease in the space within the bearing housing.

The method may comprise removing a plug from the grease outlet. The plug may be suitable for containing grease inside the bearing housing. The method may comprise fitting the pressure sensor to the grease outlet while the shaft of the wind turbine is idle. The pressure sensor may be fitted so as to be suitable for containing grease inside the bearing housing during operation of the wind turbine.

In any of the above aspects a rolling element bearing may be a bearing which carries a load by placing rolling elements (such as balls or rollers) between two bearing rings called races. The relative motion of the races may cause the rolling elements to roll with very little rolling resistance and with little sliding.

In any of the above aspects a cage slip ratio directly reflects the sliding state between the rolling elements and the raceway of the rolling element bearing. Cage slip ratio may be a ratio of the angular rotational speed of the cage with respect to the idealised angular rotational speed of the cage for a particular angular speed of the inner race.

In any of the above aspects a maintenance request may be any transmitted signal which may result in maintenance being caused to be performed on the wind turbine. This may be a specific value (such as the amount of grease or the cage slip ratio), which may be analysed at a control centre distinct from the wind turbine, which may indicate that the wind turbine requires maintenance. Alternatively, this may be a direct request for maintenance of the wind turbine which may comprise details or reasons for the request. For example, this may be formatted as: maintenance requested; wind turbine address; and/or further details (e.g. low grease volume).

BRIEF DESCRIPTION OF THE DRAWINGS

Embodiments of the invention will now be described with reference to the accompanying drawings, in which:

FIG. 7b illustrates the frequency graph found by performing a Fast Fourier Transform (FFT) of FIG. 7a.

DETAILED DESCRIPTION OF EMBODIMENT(S)

Figure 1:
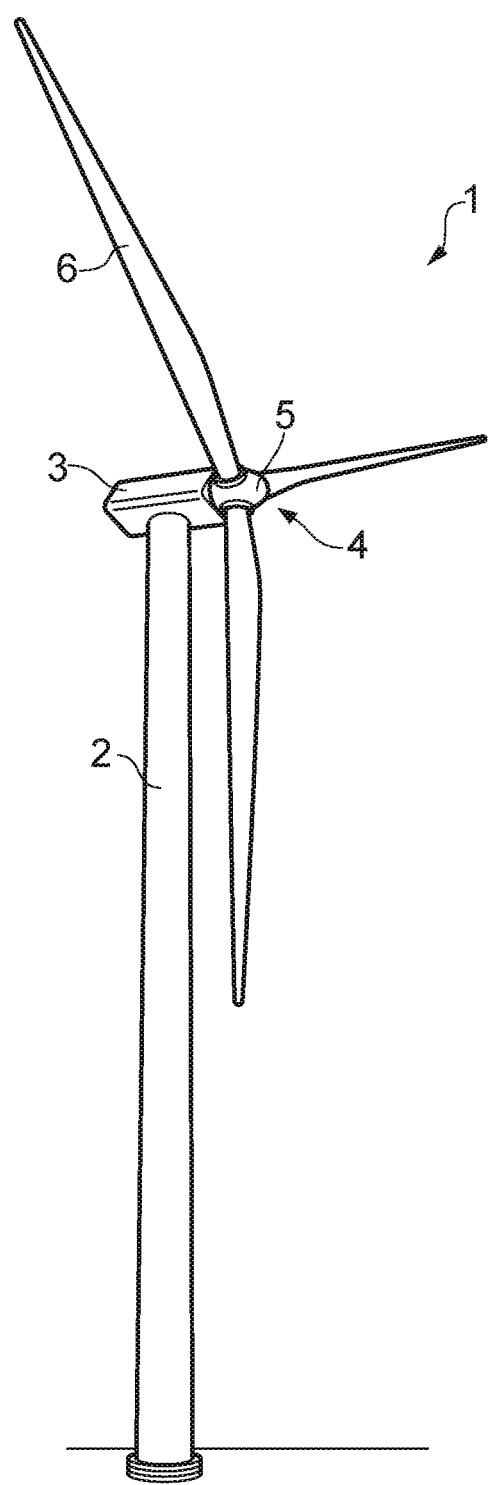
FIG. 1 illustrates a wind turbine.

FIG. 1 illustrates, in a schematic perspective view, an example of a wind turbine 1. The wind turbine 1 includes a tower 2, a nacelle 3 disposed at the apex of the tower, and, a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1.

The rotor 4 of the wind turbine 1 includes a central hub 5 and a plurality of blades 6 that project outwardly from the central hub 5. In the illustrated wind turbine 1, the rotor 4 includes three blades 6, but the number may vary. Moreover, the wind turbine comprises a control system. The control system may be placed inside the nacelle or distributed at a number of locations inside (or externally to) the turbine and communicatively connected.

When wind blows against the wind turbine 1, the blades 6 generate a lift force which causes the rotor 4 to rotate, which in turn causes the generator within the nacelle 3 to generate electrical energy.

Figure 2:
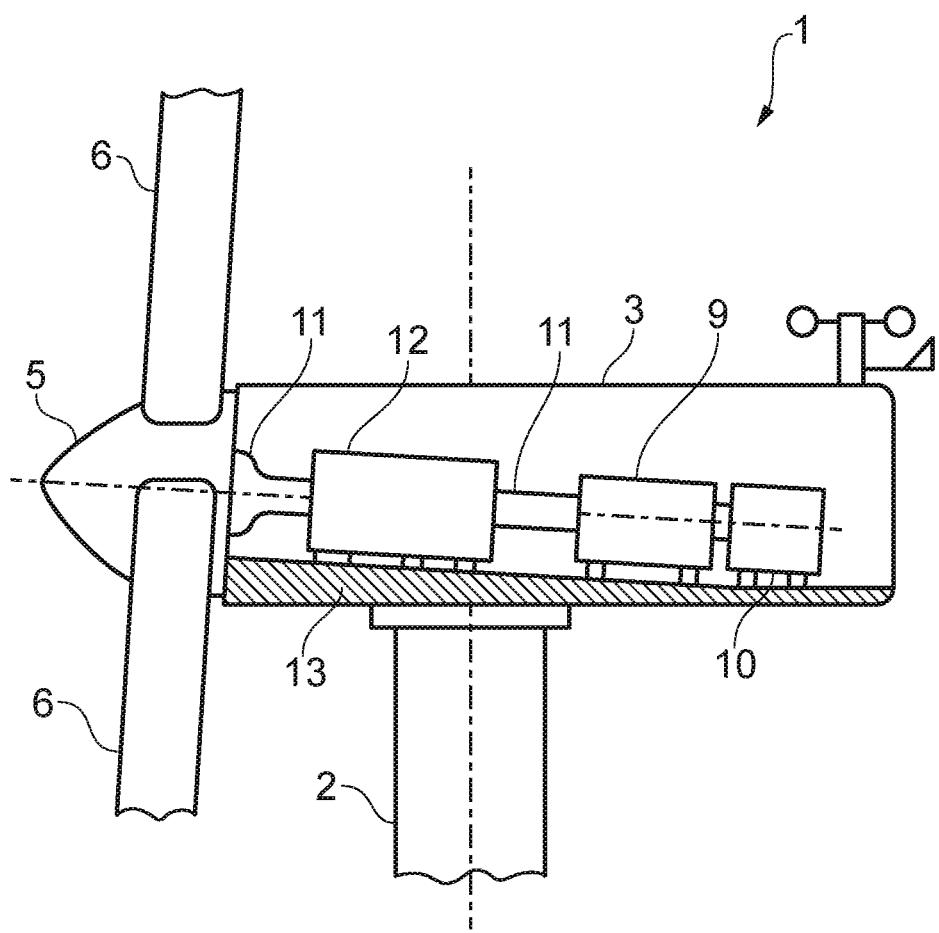
FIG. 2 schematically illustrates a cross section of a nacelle of a wind turbine showing a main shaft, a bearing housing, a gearbox, and an electrical power generator.

FIG. 2 schematically illustrates the inside of the nacelle 3 of the wind turbine 1. The nacelle 3 comprises a nacelle frame 13 which structurally supports the nacelle 3 and the components within the nacelle 3. The wind turbine 1 comprises rotor blades 6 which are mechanically connected to an electrical generator 10 via the gearbox 9. In direct drive systems, and other systems, the gearbox 9 may not be present. The electrical power generated by the generator 10 is injected into a power grid via an electrical converter (not shown). A main shaft 11 is mechanically attached to the hub 5 at a front end. A bearing housing 12 is mechanically attached to the nacelle frame 13 and is configured to rotatably support the main shaft 11 such that the bearing housing 12 supports the hub 5 and the plurality of blades 6 to allow them to rotate relative to the nacelle 3. The main shaft 11 extends through the bearing housing 12 and into the gearbox 9 (or electrical power generator 10 in a direct drive system) at a rear end.

Figure 3:
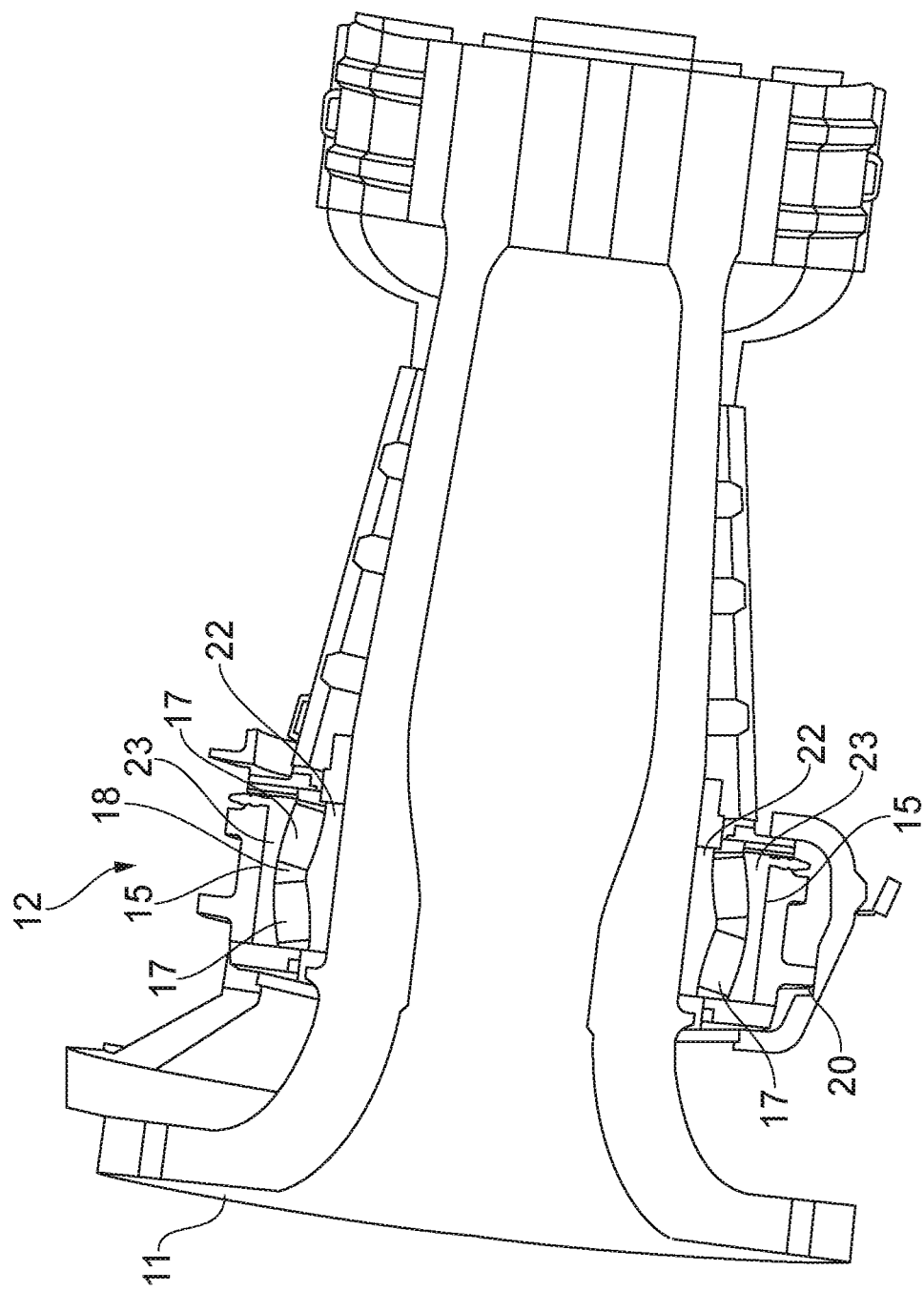
FIG. 3 schematically illustrates a cross section of a rolling element bearing and a main shaft of a wind turbine.

FIG. 3 illustrates a cross section of the main shaft 11 and main bearing housing 12 of the wind turbine 1. The main bearing housing 12 contains the rolling element bearing 15. The main bearing housing 12 rotatably supports the main shaft 11 with the rolling element bearing 15. The rolling element bearing comprises a plurality of rolling elements 17 spaced by a cage (not shown in FIG. 3) configured to guide the plurality of rolling elements 17.

The bearing housing 12 further contains grease 18 or other lubricant for lubrication of the rolling element bearing 15, in particular the plurality of rolling elements 17, in a space within the bearing housing. The grease 18 preferably partially fills, e.g. approximately half, the space with the reminder as air. The space may be vented. The space may be fluidly connected to a grease reservoir which may supply grease to the space, e.g. by a fluid pump. The space may include a sump, or other low point, within the bearing housing 12 where excess grease collects under gravity and for delivery onto the rolling element bearing 15 as the bearing rotates.

This grease 18 may be monitored with a pressure sensor 20 to gain an insight into the grease level and/or the present condition of the rolling element bearing 15 and/or may be used as an early warning system which can notify the wind turbine 1 (via a control system) and/or an operator of potential adverse events which may further be avoided (e.g. by maintenance and/or by control of the wind turbine 1).

The main shaft 11 is fixed to the inner race 22 of the rolling element bearing 15. The outer race 23 may be fixed such that is does not rotate with respect to the main bearing housing 12 during operation of the wind turbine 1. The outer race 23 may be fixed to the structure of the main bearing housing 12, the nacelle 3, or the nacelle frame 13. This allows the inner race to rotate with the main shaft 11 during operation of the wind turbine 1, with respect to the fixed outer race 23.

Figure 4:
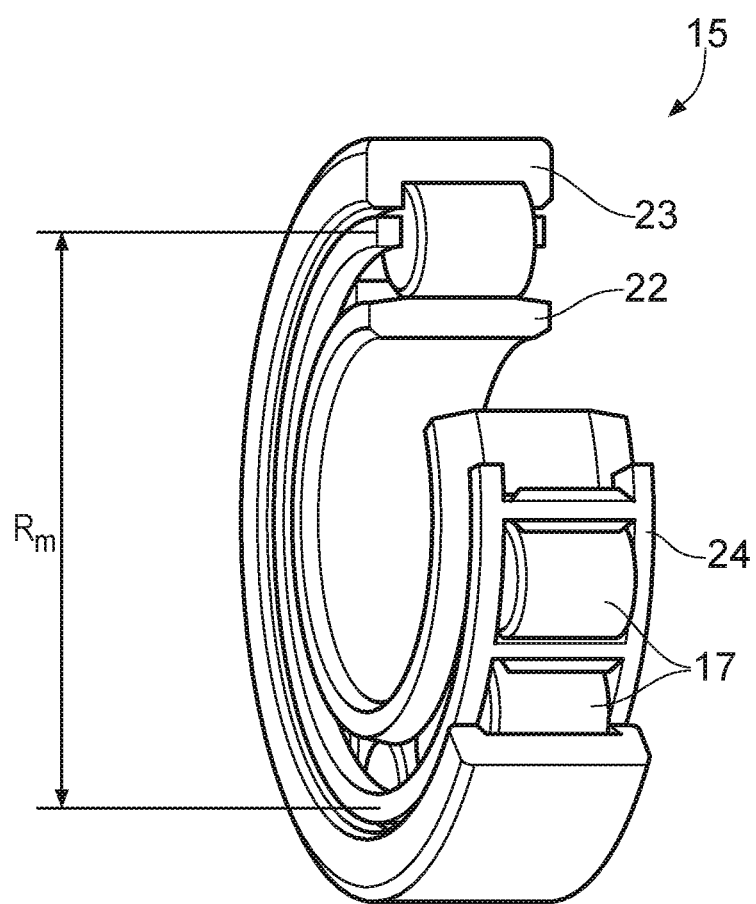
FIG. 4 illustrates a schematic example of a rolling element bearing and its constituent components.

There are many types of rolling element bearings 15, for example the rolling element bearing 15 may be cylindrical roller bearings as shown in FIG. 4. Alternatively, many other types of rolling element bearings 15 may be used, such as: single row deep-groove ball bearings; single row angular contact bearings; double row angular contact ball bearings; self-aligning ball bearings; needle roller bearings; taper roller bearings; and/or, spherical roller bearings, among others.

FIG. 4 illustrates an example of a rolling element bearing 15. The rolling element bearing 15 is shown comprising the inner race 22, the outer race 23, and the plurality of rolling elements 17 spaced by the cage 24. The cage 24 rotates with the speed of the rotation of the plurality of rolling elements about the centre of the rolling element bearing within the inner race 22 and outer race 23. The cage 24 rotation speed may be less than the inner race 22 rotation speed.

Figure 5A:
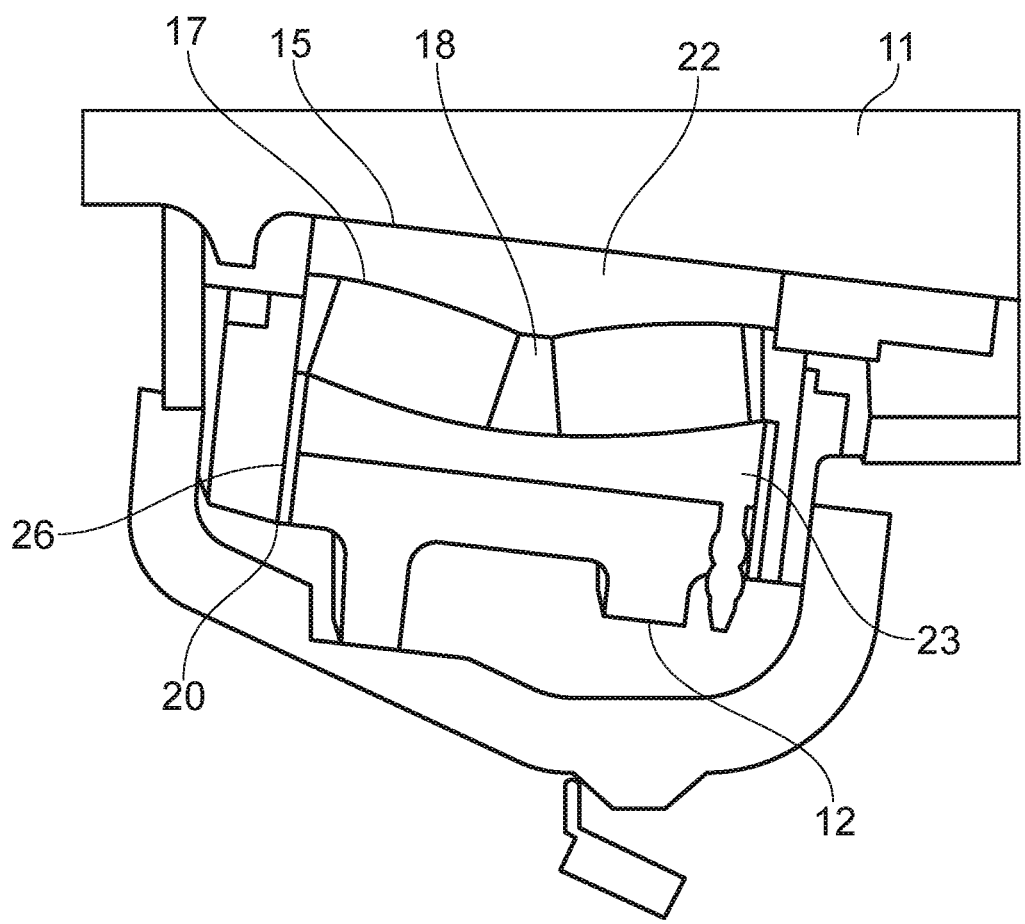
FIG. 5a schematically illustrates a magnified section of FIG. 3 showing one rolling element bearing and a single pressure sensor in a grease outlet.

FIG. 5a illustrates a magnified view of the rolling element bearing of FIG. 3. It can be seen that the wind turbine 1 further comprises the pressure sensor 20. A pressure sensor (including the pressure sensor 20) in general is an easy to work with and low-cost sensor to implement in order to monitor the grease 18 of the rolling element bearing 15. The pressure sensor 20 may dependably supervise the grease 18 without field intervention. Additional information regarding the operational condition of the rolling element bearing 15 and/or the grease 18 may be extracted from the raw pressure sensor 20 data, either on-request via a control system (not shown) or by reading the pressure sensor 20.

The pressure sensor 20 is in fluid communication with the grease 18 and configured to measure the pressure of the grease within the bearing housing 12. The pressure sensor 20 is preferably located in the sump or other low point of the bearing housing 12 where the grease 18 collects under gravity.

The bearing housing 12 comprise a grease outlet 26 for the addition and/or removal of grease 18 from the bearing housing 12, for example, during a grease replacement. The grease outlet 26 may be located at the sump or other low point of the bearing housing 12. Grease outlets such as grease outlet 26 further typically comprise a plug (not shown) suitable for containing the grease 18 inside the bearing housing 12. The plug prevents the grease 18 from escaping from the bearing housing 12 during normal operation of the wind turbine 1.

As shown in FIG. 5a the pressure sensor 20 additionally performs the same role as plug 26. The pressure sensor 20 is coupled to the grease outlet 26 such that it may be suitable for containing the grease 18 inside the rolling element bearing 15 at least during operation of the wind turbine 1. Therefore, use of a plug may no longer be required. Alternatively, a plug adaptor (not shown) may be used to couple the pressure sensor 20 to the grease outlet 26 such that it may suitable for containing the grease 18 inside the bearing housing 12 at least during operation of the wind turbine 1.

Figure 5B:
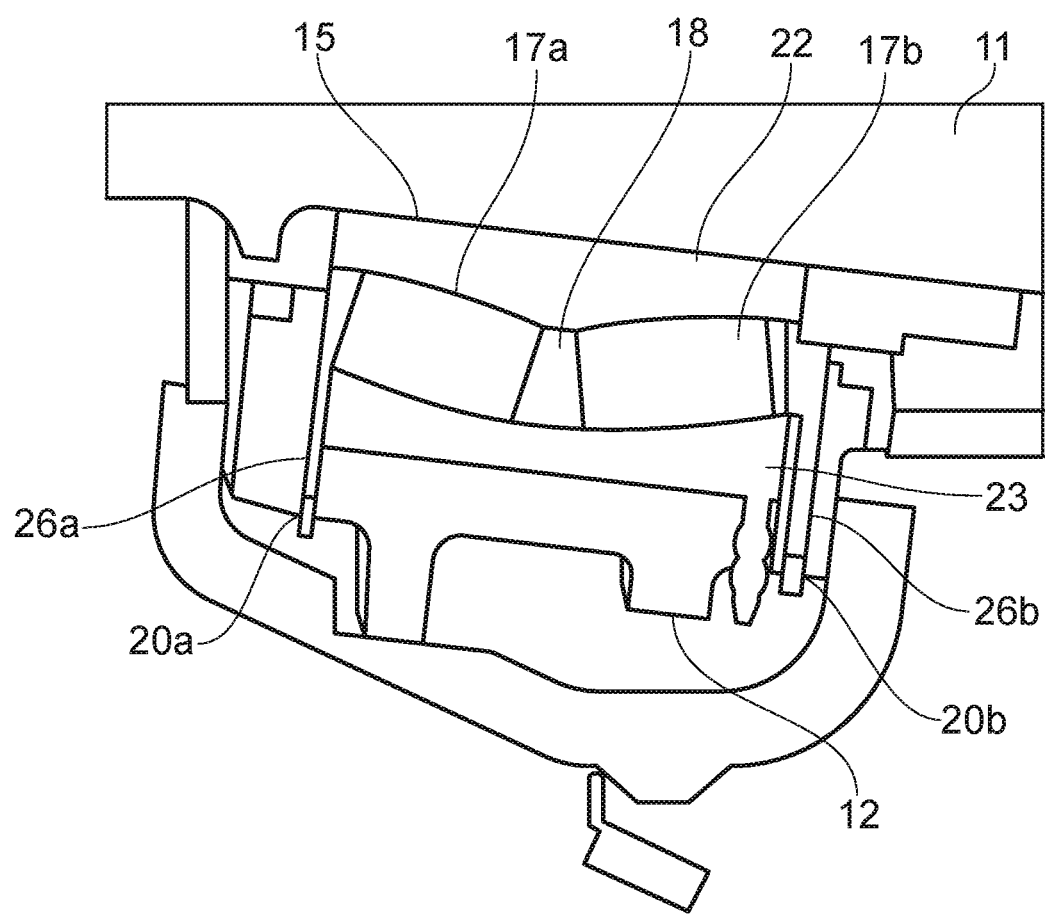
FIG. 5b schematically illustrates a magnified section of FIG. 3 showing one rolling element bearing and two pressure sensors in respective grease outlets.

FIG. 5b illustrates the same features as FIG. 5a, except it shows two pressure sensors 20a, 20b instead of one pressure sensor 20. The first pressure sensor 20a is associated with a first plurality of rolling elements 17a. The first pressure sensor 20a is in fluid communication with the grease 18 in the space within the bearing housing 12 and is positioned such that it can measure the pressure of the grease 18 associated with the first plurality of rolling elements 17a of the rolling element bearing 15. The position of the first pressure sensor 20a to the first plurality of roller bearings 17a is therefore proximal. The benefit of a proximal pressure sensor (such as 20, 20a and/or 20b) is a larger received pressure signal. This is due the attenuation of the pressure signal as it travels through the grease 18, and/or any air in the grease. In practice this may mean that the first pressure sensor 20a is positioned closer to the first plurality of roller bearings 17a than the second plurality of roller bearings 17b. The position of the first pressure sensor 20a may be defined as a first measurement point. The first measurement point is positioned to measure the pressure of the grease 18 corresponding to the first plurality of rolling elements 17a, such that the pressure signal caused by the first plurality of rolling elements 17a can be identified by the first pressure sensor 20a and the subsequent analysis of the output signal of the first pressure sensor 20a.

Similarly, the second pressure sensor 20b corresponds to the second plurality of rolling elements 17b in much the same way as described above. It is of note that the rolling element bearing 15 comprises a first plurality of rolling elements 17a and a second plurality of rolling elements 17b, each of which is spaced by a respective cage (not shown in FIG. 5b). Since each of the plurality of rolling elements 17a and 17b are part of the same rolling element bearing, both of the plurality of rolling elements 17a and 17b share the same grease 18 in the same space within the bearing housing 12.

Figure 5C:
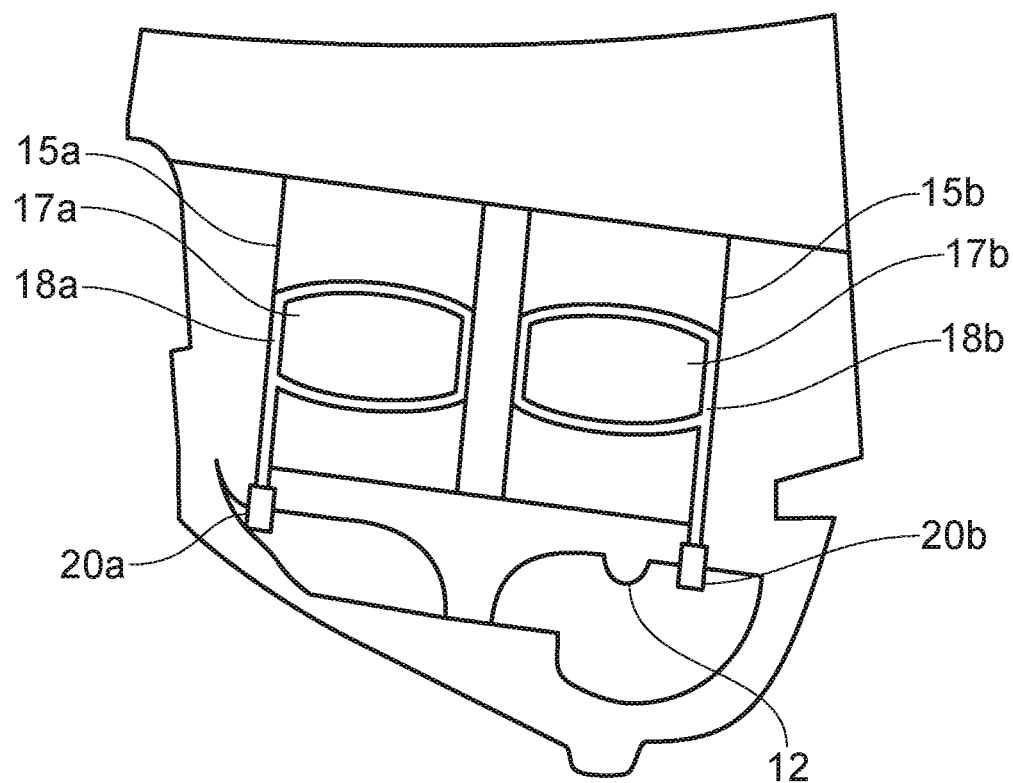
FIG. 5c schematically illustrates a magnified section of FIG. 3 showing two rolling element bearings each with a respective grease outlet and pressure sensor.

FIG. 5c illustrates that the main shaft 11 may be supported by the main bearing housing 12 which rotatably supports the main shaft 11 with first rolling element bearing 15a and second rolling element bearing 15b. Each rolling element bearing 15a, 15b comprises: a plurality of rolling elements 17a, 17b; and respective cages (not shown in FIG. 5c); and, grease 18a, 18b for lubrication (from respective spaces within the bearing housing 12). Each rolling element bearing 15a, 15b also comprises a pressure sensor 20a, 20b which is in fluid communication with the respective grease 18a, 18b in the respective space. Each pressure sensor 20a, 20b is configured to measure the pressure of the respective grease 18a, 18b within its respective space associated with the respective rolling element bearing 15a, 15b in the common bearing housing 12.

By using pressure sensor 20 in fluid communication with the grease 18 associated with the rolling element bearing 15, it is possible to monitor the rolling element bearing 15 and/or the grease level within the bearing housing of wind turbine 1. The output of the pressure sensor 20 may be analysed to decide whether maintenance or other action is required, and/or whether maintenance or other action may be required in the future. This monitoring may allow the control system (not shown) of the wind turbine 1 to halt operation of the wind turbine 1 if a major fault with the rolling element bearing 15 occurred. For example, if there was a sudden loss of grease 18, then the rolling element bearing 15 would frictionally heat and may become damaged if the wind turbine 1 continued to operate.

Typically, temperature sensors (not shown) in the wind turbine 1 may be used to indirectly sense that the bearing housing 12 is exceeding normal thermal limits and then halt operation of the wind turbine 1. However, once the temperature has risen high enough to be trigger an alarm, it may already be too late for the rolling element bearing 15 to be saved and may need replacing. This may lead to additional cost of replacing the bearing 15 accompanied with the loss due to downtime of the wind turbine.

Therefore, by using the pressure sensor 20 in fluid communication with the grease 18 in the space within the bearing housing 12 such an incident may be avoided and provide further maintenance benefits which may increase the operating lifespan of the rolling element bearing 15. The pressure sensor 20 may also be used to indicate a low grease level and prompt additional grease 18 to be added to the bearing from the lubrication system. Such pre-emptive 'bridging' action between normal scheduled maintenance may significantly reduce the number of additional maintenance services required between the normal scheduled maintenance intervals.

Figure 6:
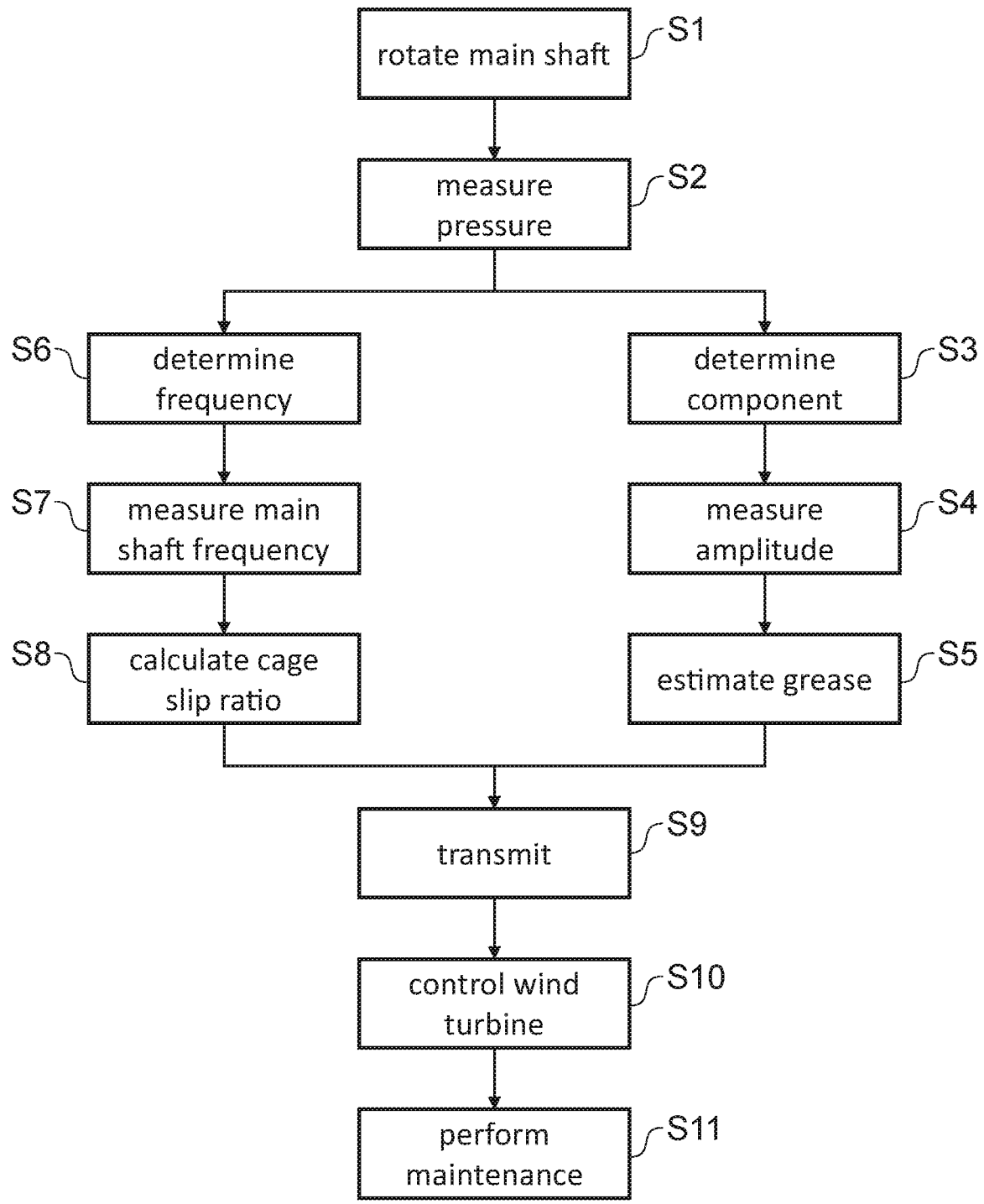
FIG. 6 illustrates a flow diagram of a method for monitoring a rolling element bearing in a wind turbine.

FIG. 6 illustrates the method of monitoring a rolling element bearing 15 of a wind turbine 1 of at least FIG. 3, 5a, 5b, or 5c. Firstly, at step S1, the main shaft is rotated, typically by operation of the wind turbine 1. The rotation of the main shaft causes the inner race 22 to move with respect to the cage 24. The rotation of the main shaft causes the cage 24 to move with respect to the outer race 23. This causes pressure fluctuations of the grease 18 which corresponds to: (i) the amount of grease 18; and, (ii) the rotation of the plurality of rolling element bearings 17, as will be described below. These pressure fluctuations may be sensed by the pressure sensor 20.

Figure 7A:
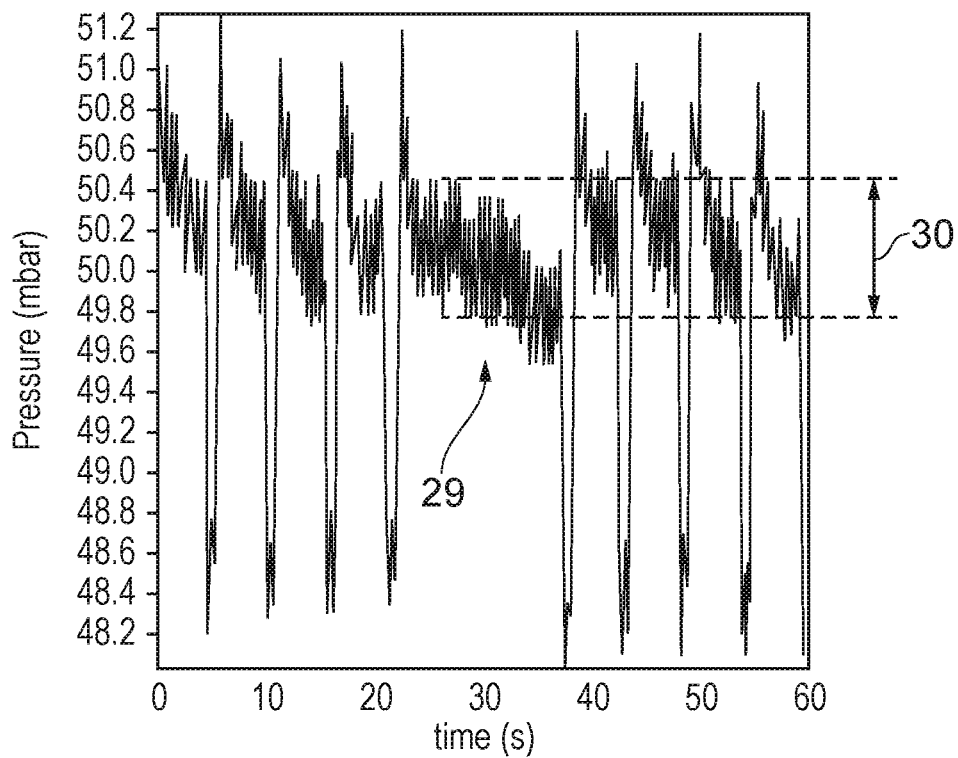
FIG. 7a illustrates a graph of bearing grease pressure against time experimentally received from a pressure sensor in fluid communication with grease within a rolling element bearing.

At step S2, the pressure fluctuations of the grease 18 may be measured by the pressure sensor 20 to generate a pressure signal. The pressure signal is shown with respect to time at FIG. 7a. FIG. 7a illustrates pressure along the y-axis and time across the x-axis.

At step S3, the amount of grease 18 in rolling element bearing 15 may be determined by isolating the pressure signal components, e.g. by decomposing the pressure signal into its constituent frequencies, and identifying the frequency which corresponds to the angular rotation speed of the plurality of rotating elements 17. Referring back to FIG. 7a, the pressure signal component 29 is shown to correspond to the rotation speed of the plurality of rolling elements. The component 29 may be a relatively high frequency signal in comparison to other signal components from the pressure sensor 20. The component 29 may also have a relatively stable amplitude 30 over many periods. The component 29 may be a consistent signal and may be present in relative isolation for a temporal majority, as shown in FIG. 7a.

The presence of large magnitude pressure signals distinct from the component 29 may be seen from FIG. 7a. These may be an artefact of the specific test rig used to gather the measurements and may not be present in operation of a wind turbine.

At step S4, the amplitude of the pressure signal components 29 is measured as shown in FIG. 7a, the result is a measured amplitude 30. Alternatively, the measured amplitude 30 may be an average of amplitude over a period of time.

At step S5, the amount of grease 18 in the rolling element bearing 15 may be estimated based on the measured amplitude 30. If the grease level is normal then the amplitude 30 will be larger. If the grease level is low then the amplitude 30 will be smaller. If no pressure signal components due to the angular rotation speed of the plurality of rotating elements 17 are observed in the pressure signal, then it can be determined that the grease level is very low or out as there is no grease between the pressure sensor 20 and the roller bearing elements to transfer the impulse. The measured pressure signal component 29 and the amplitude 30 of the pressure signal component 29 may therefore be a good proxy for the amount of grease 18 in the rolling element bearing 15. If there is a sub-optimal amount of grease 18 in the rolling element bearing 15, then the pressure fluctuations of the grease 18 will be attenuated more. This is because the pressure fluctuations of the grease 18 require grease 18 in order to propagate to the pressure sensor 20.

In addition to, or as an alternative to, generating an estimate of the amount of grease 18 in the rolling element bearing 15, the pressure signal may be used to estimate the cage slip ratio of the rolling element bearing 15. Cage slip ratio may be defined as a ratio of the angular rotational speed of the cage with respect to the idealised speed of the cage, for a particular angular rotational speed of the inner race 21 (i.e. the shaft rotational speed). Idealised cage slip ratios for a range of angular rotational speeds of the inner race can be calculated from the bearing dimensions or may be provided by the bearing manufacturer. The cage slip ratio is a proxy (or tracer) for bearing wear. Specifically, the cage slip ratio may be used to determine the wear of one or more rolling elements 17 of the plurality of rolling elements 17. The more the measured cage slip deviates from the idealised cage slip (either calculated from bearing dimensions or received from the manufacturers datasheet), the more wear will be present. This wear may be indicated by the pressure signal well in advance of any notable loss of performance or failure of the bearing. Maintenance to repair or replace the bearing may therefore be scheduled accordingly well in advance. The operation of the wind turbine may be adjusted, e.g. by limiting the rotor speed, to extend the operation of the turbine to bridge until the next scheduled maintenance. This may avoid unscheduled interim maintenance that may otherwise have become necessary.

Figure 7B:
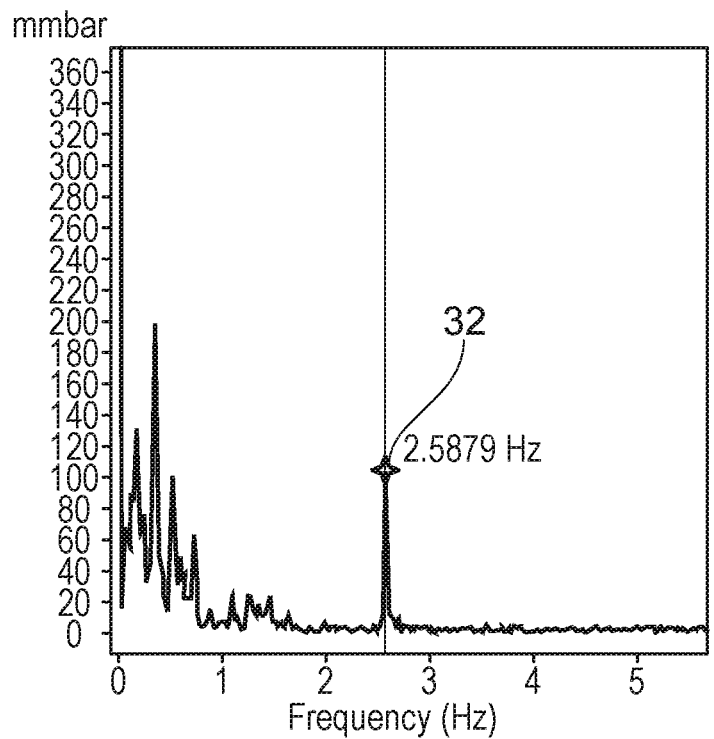

This process begins at step S6, wherein a cage frequency may be determined, which corresponds to an angular rotation speed of the plurality of rolling elements 17. Referring to FIG. 7b, which illustrates a Fast Fourier Transform (FFT) of the signal shown in FIG. 7a. FIG. 7b demonstrates there is a frequency component 32 at about 2.6 Hz (although the value depends on a multitude of factors). The frequency component 32 corresponds to the FFT of the time domain component 29. The frequency component 32 may be a relatively high frequency signal in comparison to other signal components from the pressure sensor 20. The frequency component 32 may be characterised by a relatively large magnitude due to the consistency of the component 29 (i.e. the pressure signal). The frequency component 32 may be the highest frequency signal with one of the largest magnitudes. The frequency component 32 may have a peak magnitude greater than 400% the peak magnitude of any other frequency component within a 1 Hz or 2 Hz range of the frequency component 32. The frequency component 32 represents the cage 24 rotation frequency multiplied by the number of rolling elements of the plurality of rolling elements 17. e.g. If there are ten rolling elements in the rolling element bearing 15, then ten rolling elements will pass a fixed position of the outer race 23 during one cage 24 rotation. The fixed position may be the location of the pressure sensor 20.

At step S7, the main shaft frequency may be measured from the main shaft angular rotation speed. The main shaft rotation frequency may be measured by a main shaft Tachometer (not shown) or any other sensor of the wind turbine 1, built in or otherwise.

Figure 8:
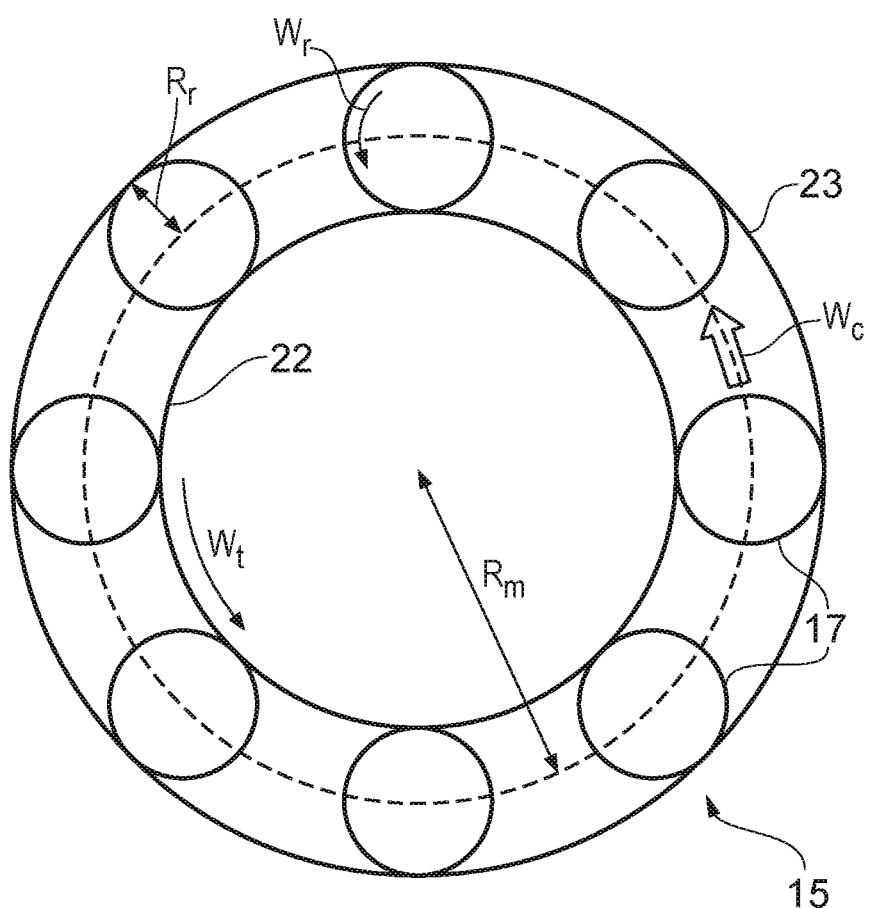
FIG. 8 illustrates a schematic view of a rolling element bearing showing the characteristic variables associated with the rolling element bearing.

At step S8, the cage slip ratio of the rolling element bearing 15 is calculated based on: the determined cage frequency and an idealised cage frequency at the measured shaft angular rotation speed. The idealised cage frequency at the measured main shaft rotation frequency may be known based on the design of the rolling element bearing 15 and/or may be received from (or easily calculated from) the bearing manufacturer's data sheets. Referring to FIG. 8, the idealised cage frequency is denoted $\omega_{cr}$ where:

$$\omega_{cr} = 0.5 * \omega_i \left(1 - \frac{R_r}{R_m}\right) \quad (1)$$

Where $R_r$ is the radius of a rolling element of the plurality of rolling elements 17, $R_m$ is the bearing pitch radius, and $\omega_i$ is the angular speed of inner race 22=the angular speed of the main shaft.

The cage slip ratio may be defined as:

$$\text{cage slip ratio} = \left(1 - \frac{\omega_c}{\omega_{cr}}\right) * 100\% \quad (2)$$

Where $\omega_c$ is the angular speed of the cage 24.

FIG. 8 illustrates a schematic view of the rolling element bearing 15 and may aid in defining the parameters used in the equations above (1), (2).

Based on the pre-determined recommended amount of grease 18, or, alternatively, the limits of the amount of grease 18 for acceptable functionality of the rolling element bearing 15, the wind turbine 1 may transmit a maintenance request. Additionally, or alternatively, the wind turbine 1 may transmit a maintenance request based on the cage slip ratio. A microcontroller (not shown) of the control system (not shown) of the wind turbine 1 may process incoming data and transmit a maintenance request based on the determined cage slip ratio and/or, the amount of grease 18. Alternatively, the control system (not shown) of the wind turbine 1 may further process the results of step S8 and step S5 to determine when, if at all, a maintenance request may be transmitted.

At step S10, the control system (not shown) of the wind turbine 1 may switch the operational state of the wind turbine 1. The calculated slip ratio and/or estimate of the amount of grease may be compared to predetermined or variable thresholds and, if exceeded, may control the wind turbine 1 to reduce the speed of the main shaft 11. The speed of the main shaft 11 may be reduced via a braking system (not shown), pitching the blades 6, or other mechanism.

Alternatively, the calculated slip ratio and/or estimate of the amount of grease may be compared to predetermined or variable thresholds and, if exceeded, may control the wind turbine 1 to halt operation of the wind turbine 1 completely, or switch the wind turbine 1 into an idle operating state.

A cage slip ratio of less than 0.5% may be considered to be within normal operational limits. The predetermined or variable threshold associated with the cage slip ratio may be 0.5%, 1%, 2%, 5%, or any value which may be considered to require maintenance (this may be determined from manufacturer's datasheets). The threshold may further depend on: the type of rolling element bearing 15; and/or, the conditions of operation. The predetermined or variable threshold associated with the amount of grease 18 may be a percentage of the maximum amount of grease 18 for a particular rolling element bearing 15, such as 0.5%, 1%, 2%, 5%, 10%, 20% or any value which may be considered to require maintenance (this may be determined from manufacturer's datasheets). The threshold may further depend on, the type of rolling element bearing 15, and/or the conditions of operation.

As an example, the step of S10 may be required if there is a dramatic loss of the amount of grease as estimated at step S5. This may indicate a sudden grease 18 pressure loss which could cause damage to the rolling element bearing 15. Alternatively, a large change in the value of cage slip ratio may be indicative of a damaged rolling element bearing 15.

Although not shown in the Figures, an air breather/pressure relief valve may be used with the grease cavity or space of the bearing housing 12 for accommodating pressure changes with temperature. This pressure change with temperature may be factored into any calculations for the amount of grease 18 and/or cage slip ratio. A temperature sensor may be utilised for this purpose.

At step S11, maintenance is performed on the rolling element bearing 15 based on the determined cage slip ratio and/or, the amount of grease 18. Maintenance may comprise adding grease to the rolling element bearing 15. Maintenance may comprise replacing the grease 18 in the rolling element bearing 15. Maintenance may comprise dis-assembly of the rolling element bearing 15 and the replacement of some or all components or parts. For example, at least some of the plurality of rolling elements 17, or any other components of the rolling element bearing 15 may be replaced.

Any of the steps S9, S10 and S11 may take place in any order. At least some of the steps S9, S10 and S11 may not take place for some operations, or even at all. For example the steps S1-S8 may be performed during a maintenance test, therefore steps S9 and S10 are not required to be performed during this test. Further, the step of S11 only needs to be performed if there are results from step 8 and/or S5 which require maintenance on the rolling element bearing 15. Moreover, it would be clear to the skilled person that there would be no requirement for steps S3-S5 or steps S6-S8 be performed at all, such that only one of the cage slip ratio and/or, the amount of grease 18 in the rolling element bearing 15 may be determined.

The main bearing housing 12 and/or the rolling element bearing 15 of FIG. 3 can be assembled or retro-fitted by the addition of the pressure sensor 20 to: a rolling element bearing 15; main bearing housing 12; or, any part of the wind turbine 1. The addition of the pressure sensor 20 is such that the pressure sensor 20 is in fluid contact with the grease 18 of the rolling element bearing 15. Since the only requirement is that the pressure sensor 20 is in fluid contact with the grease 18 of the rolling element bearing 15, there may be few physical limitations to the location of the pressure sensor 20. The pressure sensor 20 may have a small overall size, and/or be a wireless sensor (the pressure sensor may be wired in some applications). These features enable the pressure sensor 20 to have few physical location limitations when assembling or retro-fitting. For example, the pressure sensor 20 may be positioned in the grease outlet 26 during assembly.

Retro-fitting may place the pressure sensor 20 in a sub-optimal location for pressure sensing, but may result in minimal changes to the existing rolling element bearing 15 in order to accommodate the pressure sensor 20. Therefore, this system may be optimal overall depending upon the application and purpose. Positioning the pressure sensor 20 in the grease outlet 26 may be especially useful for retro-fitting, because the grease outlet 26 is already an access point for the grease 18. In another example, the pressure sensor 20 may be manufactured such that it is inside the rolling element bearing 15, or outside the rolling element bearing 15 but at another location within the main bearing housing 12. If the pressure sensor 20 was inside the rolling element bearing 15, it may be positioned on the outside race 23 in fluid contact with the grease 18, or on the inside race 22, or at a side of the rolling element bearing 15 positioned such that the plurality of rolling elements 17 are not hindered in their path. In conclusion, the pressure sensor 20 may be manufactured to be positioned anywhere around the rolling element bearing 15 so long as it can measure the presence of the grease 18 within the bearing housing that is in contact with the rolling element bearing 15.

As mentioned previously, the grease outlet 26 is particularly convenient for retro-fitting the pressure sensor an existing rolling element bearing housing 12. The process of retro-fitting a pressure sensor 20 may require the removal of the plug from the grease outlet 26, and the insertion of the pressure sensor 20 to the grease outlet 26. Ideally this process occurs while the main shaft of the wind turbine 1 is stationary to avoid unnecessary grease 18 pressure loss and to allow maintenance personnel access. The end result of retro-fitting is that the pressure sensor 20 is secured in the grease outlet 26 so that it is suitable for containing the grease 18 inside the rolling element bearing 15 during operation of the wind turbine 1. Thus, the pressure sensor 20 may be used as a fixed installed item for a condition monitoring system (CMS) or as a diagnostic tool for service technicians.

The method of manufacturing the wind turbine (specifically, the main bearing housing 12 and/or the rolling element bearing 15) by assembling or retro-fitting the pressure sensor 20, is also equally applicable if there are two pressure sensors 20a, 20b to be retrofitted or assembled to the same rolling element bearing 15 in the manner described above.

The benefits of the wind turbine and respective methods are:
1. Avoiding a time consuming inspection of the rolling element bearing 15 which may otherwise be done by periodically monitoring the rolling element bearing 15 by removing the main bearing housing 12 cover and/or by disassembling part of the rolling element bearing 15.
2. Generating important information for service planning to save on resources.
3. Generating an early alert for grease 18 losses, which may be caused by seal damage or wear.
4. Monitoring the inner pressure of the rolling element bearing 15 to ensure correct breather and seal function.
5. Backing up the lubrication system function.
6. Cold triggering of the lubrication system as emergency mediation until service can be organised.

Although the invention has been described above with reference to one or more preferred embodiments, it will be appreciated that various changes or modifications may be made without departing from the scope of the invention as defined in the appended claims.

The invention claimed is:

1. A wind turbine comprising:
a bearing housing; a rolling element bearing within the bearing housing and a space within the bearing housing for containing grease for lubricating the rolling element bearing; a shaft rotatably supported by the rolling element bearing; and, a pressure sensor, wherein the pressure sensor is in fluid communication with the space and configured to measure the pressure of grease in the space within the bearing housing.

2. The wind turbine of claim 1, wherein the bearing housing further comprises a grease outlet for adding and/or removing grease from the space within the bearing housing, wherein the pressure sensor is coupled to the grease outlet and suitable for containing grease inside the bearing housing during operation of the wind turbine.

3. The wind turbine of claim 1, wherein the rolling element bearing comprises a plurality of rolling elements spaced by a cage.

4. The wind turbine of claim 1, wherein the pressure sensor is a first pressure sensor, and
wherein the wind turbine further comprises a second pressure sensor in fluid communication with the space and configured to measure the pressure of grease in the space within the bearing housing,
wherein the first pressure sensor is in fluid communication with the space at a first measurement point, and the second pressure sensor is in fluid communication with the space at a second measurement point.

5. The wind turbine of claim 4, wherein the rolling element bearing comprises a first plurality of rolling elements spaced by a cage, and further comprises a second plurality of rolling elements spaced by a second cage,
wherein the first measurement point is positioned to measure the pressure of grease in the space adjacent the first plurality of rolling elements, and the second measurement point is further positioned to measure the pressure of grease in the space adjacent the second plurality of rolling elements.

6. The wind turbine of claim 1, wherein the bearing housing is a main bearing housing, and the shaft is a main shaft of the wind turbine.

7. A method of monitoring a wind turbine of claim 1, the method comprising:
rotating the shaft;
measuring the pressure of grease in the space within the bearing housing using the pressure sensor to generate a pressure signal as the shaft rotates; and
determining the cage slip ratio of the rolling element bearing and/or the amount of grease in the space within the bearing housing, based on the pressure signal.

8. The method of claim 7, wherein determining the cage slip ratio of the rolling element bearing comprises:
determining a cage frequency from the pressure signal, wherein the cage frequency corresponds to an angular rotation speed of the plurality of rolling elements of the rolling element bearing;
measuring the shaft angular rotation speed; and
calculating the cage slip ratio of the rolling element bearing based on the determined cage frequency and an ideal cage frequency at the measured shaft angular rotation speed.

9. The method of claim 8, wherein determining the cage frequency from the pressure signal comprises decomposing the pressure signal into its constituent frequencies and identifying the frequency corresponding to the angular rotation speed of the plurality of rolling elements of the rolling element bearing.

10. The method of any of claim 7, wherein determining the amount of grease in the space within the bearing housing comprises:
decomposing the pressure signal into its constituent frequencies and identifying the frequency corresponding to the angular rotation speed of the plurality of rolling elements of the rolling element bearing;

measuring the amplitude of the decomposed pressure signal at the frequency corresponding to the angular rotation speed of the plurality of rolling elements of the rolling element bearing; and, estimating the amount of grease in the space within the bearing housing based on the measured amplitude.

11. The method of claim 7, further comprising:
transmitting a maintenance request based on the determined cage slip ratio, and/or, amount of grease.

12. The method of claim 7, further comprising:
controlling the speed of the shaft or halting operation of the wind turbine based on the determined cage slip ratio, and/or, amount of grease.

13. The method of claim 7, further comprising:
performing maintenance on the wind turbine based on the determined cage slip ratio, and/or, amount of grease.

14. A method of assembling or retro-fitting a wind turbine comprising a bearing housing, a rolling element bearing within the bearing housing and a space within the bearing housing for containing grease for lubricating the rolling element bearing, and a shaft rotatably supported by the rolling element bearing, the method comprising:

fitting a pressure sensor such that it is in fluid communication with the space and configured to measure the pressure of grease in the space within the bearing housing.

15. The method of claim 14, wherein the bearing housing further comprises a grease outlet for adding and/or removing grease from the space within the bearing housing, the method further comprising:

removing a plug from the grease outlet, the plug suitable for containing grease inside the bearing housing; and, fitting the pressure sensor to the grease outlet while the shaft of the wind turbine is idle, wherein the pressure sensor is fitted so as to be suitable for containing grease inside the bearing housing during operation of the wind turbine.

* * * * *